US011149831B2

(12) United States Patent
Matsuda

(10) Patent No.: US 11,149,831 B2
(45) Date of Patent: Oct. 19, 2021

(54) LOCK-UP DEVICE FOR TORQUE CONVERTER

(71) Applicant: EXEDY Corporation, Neyagawa (JP)

(72) Inventor: Satoru Matsuda, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 97 days.

(21) Appl. No.: 16/532,748

(22) Filed: Aug. 6, 2019

(65) Prior Publication Data

US 2020/0072333 A1 Mar. 5, 2020

(30) Foreign Application Priority Data

Sep. 5, 2018 (JP) .............................. JP2018-165932

(51) Int. Cl.
*F16H 45/02* (2006.01)
*F16F 15/123* (2006.01)
*F16D 39/00* (2006.01)

(52) U.S. Cl.
CPC ............. *F16H 45/02* (2013.01); *F16D 39/00* (2013.01); *F16F 15/12373* (2013.01); *F16D 2300/22* (2013.01); *F16H 2045/0221* (2013.01); *F16H 2045/0289* (2013.01)

(58) Field of Classification Search
CPC ..... F16H 45/02; F16D 39/00; F16F 15/12373
See application file for complete search history.

(56) References Cited

U.S. PATENT DOCUMENTS

| 2001/0052443 A1* | 12/2001 | Tomiyama | F16H 45/02 |
| | | | 192/3.29 |
| 2015/0247550 A1* | 9/2015 | Tomiyama | F16F 15/1338 |
| | | | 464/68.92 |
| 2020/0248789 A1* | 8/2020 | Watanabe | F16F 15/1217 |

FOREIGN PATENT DOCUMENTS

JP 2017-166673 A 9/2017

* cited by examiner

*Primary Examiner* — Charles A Fox
*Assistant Examiner* — Jessica L Burkman
(74) *Attorney, Agent, or Firm* — United IP Counselors, LLC

(57) ABSTRACT

A lock-up device for a torque converter is disclosed. The lock-up device includes a clutch part, first and second rotary members, a plurality of elastic members and a stopper mechanism. The clutch part is provided between a front cover and a turbine, and transmits the torque inputted to the front cover to the turbine. The first rotary member is disposed between the clutch part and the turbine. The second rotary member is rotatable relative to the first rotary member. The elastic members elastically couple an outer peripheral part of the first rotary member and an outer peripheral part of the second rotary member in a rotational direction. The stopper mechanism is disposed axially between the elastic members and an outer peripheral part of a turbine shell. The stopper mechanism includes an engaging portion restricting an angular range of relative rotation between the first rotary member and the second rotary member.

10 Claims, 8 Drawing Sheets

LOCK-UP DEVICE FOR TORQUE CONVERTER

CROSS-REFERENCE TO RELATED APPLICATIONS

This application claims priority to Japanese Patent Application No. 2018-165932, filed Sep. 5, 2018. The contents of that application are incorporated by reference herein in their entirety.

TECHNICAL FIELD

The present invention relates to a lock-up device, and particularly to a lock-up device for a torque converter for transmitting a torque from a front cover to a transmission-side member through a turbine including a turbine shell.

BACKGROUND ART

In general, a lock-up device for a torque converter includes a damper mechanism for absorbing and reducing torsional vibration. The damper mechanism includes input-side and output-side plates, which are rotatable relative to each other, and a plurality of coil springs that are provided as elastic members between the both plates. The input-side plate is a component to which a torque is inputted from a clutch part. On the other hand, the output-side plate is a component coupled to a turbine of the torque converter.

The damper mechanism configured as described above is provided with a stopper mechanism for restricting the angle of relative rotation (torsion angle) between the input-side plate and the output-side plate to a predetermined angular range. The stopper mechanism can prevent an excessive torque from being inputted to each coil spring, and can control torsional characteristics by restricting the amount of actuation of each coil spring.

Now, a stopper mechanism described in Japan Laid-open Patent Application Publication No. 2017-166673 is formed by utilizing a driven plate and an intermediate plate coupling inner peripheral side springs and outer peripheral side springs. Specifically, the intermediate plate is provided with cutouts, each of which is elongated in a circumferential direction, whereas the driven plate is provided with stopper pawls, each of which is inserted into each cutout. Additionally, each stopper pawl is contactable with the end surfaces of each cutout, whereby the torsion angle between the intermediate plate and the driven plate is restricted to a predetermined angular range.

The stopper mechanism described in Japan Laid-open Patent Application Publication No. 2017-166673 is disposed laterally to a turbine shell, while being disposed radially between the inner peripheral side springs and the outer peripheral side springs. In other words, the stopper mechanism is disposed in an axially quite narrow space produced in a radially intermediate part of the lock-up device. Because of this, a large load is borne by a portion at which each cutout and each stopper pawl are engaged. Besides, it is difficult to reliably produce a sufficient margin of overlap for each cutout and each stopper (an area of the portion at which the both are engaged). Consequently, it is difficult to inhibit abrasion of the engaging portion at which each cutout and each stopper pawl are engaged.

It is an object of the present invention to enable inhibiting abrasion of an engaging portion of a stopper mechanism by reducing a load borne by the engaging portion and by reliably producing a sufficient margin of overlap for the engaging portion.

BRIEF SUMMARY (1) A lock-up device for a torque converter according to the present invention transmits a torque inputted to a front cover to a transmission-side member through a turbine including a turbine shell. The present lock-up device includes a clutch part, a first rotary member, a second rotary member, a plurality of elastic members and a stopper mechanism.

The clutch part is provided between the front cover and the turbine, and transmits the torque inputted to the front cover to the turbine. The first rotary member is disposed between the clutch part and the turbine. The second rotary member is rotatable relative to the first rotary member, and is coupled to the turbine. The plurality of elastic members elastically couple an outer peripheral part of the first rotary member and an outer peripheral part of the second rotary member in a rotational direction. The stopper mechanism is disposed axially between the plurality of elastic members and an outer peripheral part of the turbine shell. The stopper mechanism includes an engaging portion restricting an angular range of relative rotation between the first rotary member and the second rotary member.

In the present device, after transmitted from the clutch part, the torque is transmitted from the first rotary member to the second rotary member through the plural elastic members, and is further outputted to the transmission-side member. In this actuation, the angle of relative rotation (torsion angle) between the first and second rotary members is restricted by the stopper mechanism when becoming a predetermined angle.

The plural elastic members are herein disposed between the outer peripheral part of the first rotary member and that of the second rotary member. Besides in general, a relatively large space exists axially between the elastic members and the outer peripheral part of the turbine shell. Because of this, in the present invention, the stopper mechanism is disposed in this relatively large space. Therefore, it is possible to reliably produce a sufficient margin of overlap for the engaging portion composing part of the stopper mechanism. Additionally, the radial position of the engaging portion is located on the outer peripheral side. Hence, it is possible to reduce a load borne by the engaging portion. Because of this, abrasion of the engaging portion can be inhibited.

(2) Preferably, the engaging portion of the stopper mechanism includes a stopper pawl and a cutout. The stopper pawl is provided on one of the first and second rotary members, and extends toward the other of the first and second rotary members. The cutout is provided on the other of the first and second rotary members. The cutout makes the stopper pawl rotatable within a predetermined angular range while the stopper pawl is inserted therein.

Here, for example, the first rotary member is provided with the stopper pawl, whereas the second rotary member is provided with the cutout. Additionally, when torsion of the first rotary member relative to the second rotary member is made by a predetermined angle, the stopper pawl makes contact with an end surface of the cutout. Accordingly, the torsion angle between the both rotary members is restricted.

Similarly to the above, it is herein possible to reliably produce a sufficient margin of overlap for a portion at which the stopper pawl and the end surface of the cutout is engaged. Besides, it is possible to reduce a load borne by the engaging portion. Furthermore, the stopper mechanism is composed of the stopper pawl and the cutout. Hence, the stopper mechanism is simplified in configuration.

(3) Preferably, the stopper pawl is formed by extending in part the first rotary member toward the turbine. Additionally, the cutout is provided in a cutout-provided portion. The cutout-provided portion is formed by extending in part the outer peripheral part of the second rotary member radially outward.

The stopper pawl and the cutout are herein provided by utilizing the first rotary member and the second rotary member. Hence, it is not required to provide any component exclusively for composing the stopper mechanism.

(4) Preferably, the stopper pawl and the cutout-provided portion intersect at a predetermined angle.

(5) Preferably, the stopper pawl and the cutout-provided portion extend to tilt at substantially equal angles with respect to a rotational axis of the first and second rotary members.

(6) Preferably, the first rotary member includes a plurality of holding portions and a plurality of pawl-provided portions. The plurality of holding portions are provided in an outer peripheral end of the first rotary member, and accommodate and hold the plurality of elastic members. The plurality of pawl-provided portions are each provided between circumferentially adjacent two of the plurality of holding portions. Additionally, the stopper pawl is provided in each of the plurality of pawl-provided portions.

Here, the holding portions and the pawl-provided portions are alternately provided in the outer peripheral end of the first rotary member in the circumferential direction. Additionally, the stopper pawl is provided in each of the pawl-provided portions by which the elastic members are not held. Hence, forming the stopper pawl is made easy.

(7) Preferably, the plurality of holding portions and the plurality of pawl-provided portions are provided circumferentially continuous to each other. Outer peripheral parts of the plurality of pawl-provided portions are formed by pressing outer peripheral parts of the plurality of holding portions radially inward.

Here, the holding portions and the pawl-provided portions can be formed by stamping. Additionally, the pawl-provided portions are formed by pressing the outer peripheral parts of the holding portions. Hence, the outer peripheral part of the first rotary member is enhanced in strength.

(8) Preferably, the plurality of pawl-provided portions of the first rotary member are opposed at circumferential ends thereof to circumferential end surfaces of the plurality of elastic members, and are capable of transmitting the torque together with the plurality of elastic members therebetween. Additionally, the second rotary member includes a plurality of engaging portions. The plurality of engaging portions each have an axially extending shape, and transmit the torque together with the plurality of elastic members therebetween.

Here, a torque is transmitted from the first rotary member to the elastic members through the pawl-provided portions of the first rotary member. Additionally, the torque is transmitted from the elastic members to the second rotary member through the engaging portions of the second rotary member.

(9) Preferably, the lock-up device further includes a third rotary member and a plurality of inner peripheral side elastic members. The third rotary member is coupled to an output side of the clutch part, and is rotatable relative to the first rotary member and the second rotary member. The plurality of inner peripheral side elastic members are disposed radially inside the plurality of elastic members, and elastically couple the third rotary member and the first rotary member in the rotational direction.

Here, the torque, after transmitted from the clutch part, is transmitted to the third rotary member and is further transmitted to the first rotary member through the inner peripheral side elastic members.

(10) A lock-up device for a torque converter according to another aspect of the present invention is disposed between a front cover and a torque converter body including a torus, and transmits a torque inputted to the front cover to a turbine of the torque converter body therethrough. The present lock-up device includes a clutch part, a first rotary member, a second rotary member, a plurality of elastic members and a stopper mechanism.

The clutch part is provided between the front cover and the turbine, and transmits the torque inputted to the front cover to the turbine. The first rotary member is disposed between the clutch part and the turbine. The second rotary member is rotatable relative to the first rotary member, and is coupled to the turbine. The plurality of elastic members are disposed on an outer peripheral side of a center of the torus, and elastically couple the first rotary member and the second rotary member in a rotational direction. The stopper mechanism is disposed on the outer peripheral side of centers of the plurality of elastic members, and restricts an angle of relative rotation between the first rotary member and the second rotary member to a predetermined angular range.

Here, the stopper mechanism is provided in a relatively large space located on the outer peripheral side of the torque converter body. Because of this, it is possible to reliably produce a sufficient margin of overlap for the engaging portion composing part of the stopper mechanism. Additionally, the radial position of the engaging portion is located on the outer peripheral side. Hence, it is possible to reduce a load borne by the engaging portion.

Overall, in the present invention described above, the stopper mechanism is disposed in a relatively large space produced on the outer peripheral side. Hence, it is possible to inhibit abrasion of the engaging portion of the stopper mechanism by reducing a load borne by the engaging portion and by reliably producing a sufficient margin of overlap for the engaging portion.

DETAILED DESCRIPTION

Figure 1:
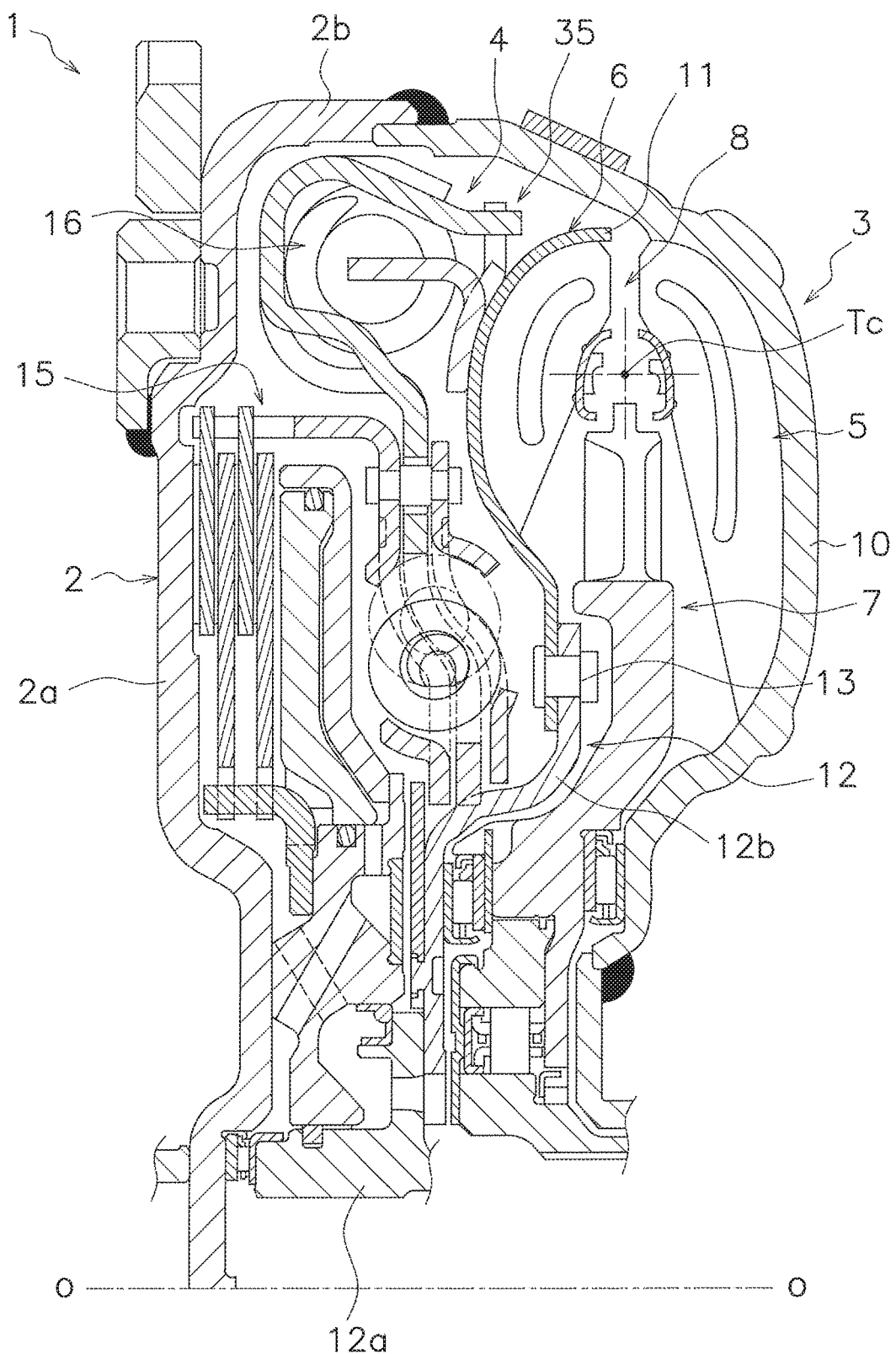
FIG. 1 is a cross-sectional view of a torque converter including a lock-up device according to a preferred embodiment of the present invention.

FIG. 1 is a partial cross-sectional view of a torque converter 1 including a lock-up device according to a preferred embodiment of the present invention. In FIG. 1, an engine (not shown in the drawing) is disposed on the left side whereas a transmission (not shown in the drawing) is disposed on the right side. It should be noted that line O-O depicted in FIG. 1 is a rotational axis of the torque converter 1. It should be also noted that in the following explanation, the term "radial direction" refers to a direction separating from the rotational axis whereas the term "axial direction" refers to a direction arranged along the rotational axis.

[Entire Configuration of Torque Converter 1]

The torque converter 1 is a device for transmitting a torque from an engine-side crankshaft (not shown in the drawings) to an input shaft of the transmission (not shown in the drawings). As shown in FIG. 1, the torque converter 1 includes a front cover 2, a torque converter body 3 and a lock-up device 4.

The front cover 2 is fixed to an input-side member. The front cover 2 includes a disc portion 2a and a tubular portion 2b provided on the outer peripheral part of the disc portion 2a so as to extend toward the transmission.

The torque converter body 3 includes an impeller 5, a turbine 6 and a stator 7. Additionally, an annular space (torus) 8 is formed by the impeller 5, the turbine 6 and the stator 7.

The impeller 5 includes an impeller shell 10, and the impeller shell 10 is fixed at the outer peripheral part thereof to the tubular portion 2b of the front cover 2 by welding. The turbine 6 is disposed in opposition to the impeller 5, and includes a turbine shell 11 and a turbine hub 12. The turbine hub 12 includes a hub 12a and a flange 12b. The hub 12a is made in the shape of a tube extending in the axial direction. The flange 12b extends radially outward from the hub 12a. The inner peripheral part of the turbine shell 11 is fixed to the flange 12b by a plurality of rivets 13. Additionally, the hub 12a is provided with a spline hole in the inner peripheral part thereof. The spline hole is engaged with the input shaft of the transmission (not shown in the drawings). The stator 7 is disposed between the inner peripheral part of the impeller 5 and that of the turbine 6.

[Lock-Up Device 4]

Figure 2:
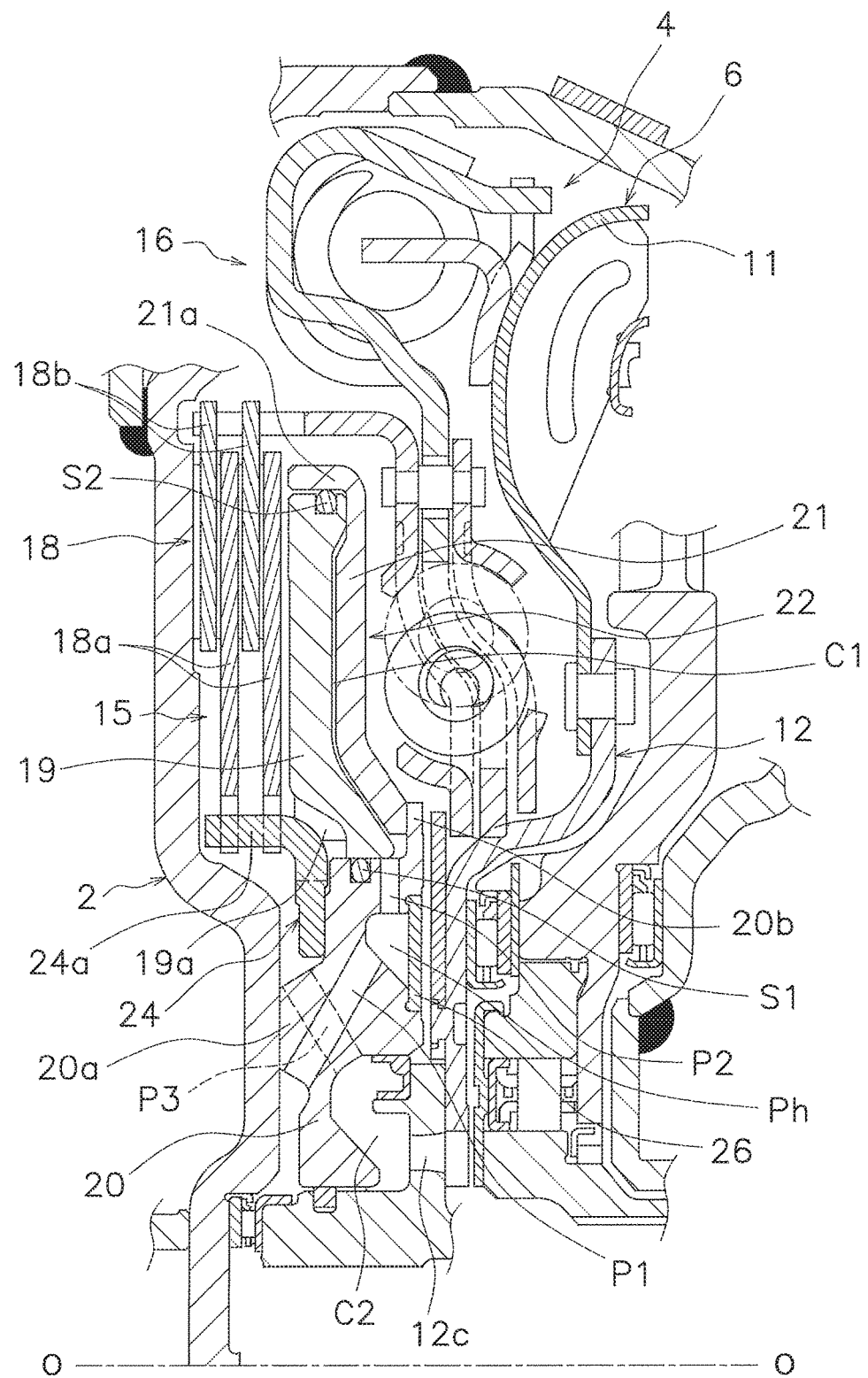
FIG. 2 is a diagram showing a clutch part extracted from the device in FIG. 1.

As shown in FIGS. 1 and 2, the lock-up device 4 is disposed in a space between the front cover 2 and the turbine 6. The lock-up device 4 includes a clutch part 15 and a damper part 16.

<Clutch Part 15>

As shown in FIGS. 1 and 2, the clutch part 15 includes a plurality of clutch plates 18, a piston 19, and a support member 22 composed of a sleeve 20 and an oil chamber plate 21.

The plural clutch plates 18 are disposed between the front cover 2 and the piston 19. The plural clutch plates 18 include two first clutch plates 18a and two second clutch plates 18b. Each first clutch plate 18a has an annular shape, and likewise, each second clutch plate 18b has an annular shape. These two types of clutch plates, i.e., the first and second clutch plates 18a and 18b, are alternately disposed while being aligned in the axial direction. Each first clutch plate 18a is provided with a plurality of teeth on the inner peripheral part thereof. Each second clutch plate 18b is provided with a plurality of teeth on the outer peripheral part thereof, and is also provided with two friction members fixed to the both lateral surfaces thereof.

The piston 19 has an annular shape and is disposed on the transmission side of the front cover 2. The piston 19 is supported by the support member 22, while being movable in the axial direction. The piston 19 presses the plural clutch plates 18 toward the front cover 2. The piston 19 is provided with a plurality of engaging protrusions 19a protruding from the inner peripheral end thereof to the inner peripheral side. The plural engaging protrusions 19a are provided at predetermined intervals in the circumferential direction.

The sleeve 20 composes part of the support member 22 and includes an annular protrusion 20a. The annular protrusion 20a axially protrudes from the front cover 2-side lateral surface of the sleeve 20. Therefore, gaps are produced between the front cover 2 and the sleeve 20, and are located on the inner peripheral side and the outer peripheral side of the annular protrusion 20a, respectively. The annular protrusion 20a is fixed to one lateral surface of the front cover 2 by welding or so forth. Thus, the sleeve 20 is rotated in synchronization with the front cover 2. Additionally, the sleeve 20 is provided with a flange 20b on the turbine 6-side end of the outer peripheral part thereof. The flange 20b has an annular shape and extends radially outward.

A drive hub 24 is fixed to the sleeve 20. The drive hub 24 supports the first clutch plates 18a. The drive hub 24 is fixed to the front cover 2-side lateral surface of the sleeve 20, and includes a tubular portion 24a on the outer peripheral part thereof. The tubular portion 24a is provided with a plurality of slits extending in the axial direction. The teeth, provided on the inner peripheral part of each first clutch plate 18a, are engaged with the plural slits. With this configuration, each first clutch plate 18a is non-rotatable relative to the drive hub 24 (i.e., the sleeve 20) but are movable relative thereto in the axial direction.

Additionally, the engaging protrusions 19a of the piston 19 are engaged with the slits of the drive hub 24, respectively. With this configuration, the piston 19 is rotated in synchronization with the sleeve 20 and the front cover 2 through the drive hub 24.

The oil chamber plate 21 composes part of the support member 22 and is disposed on the turbine 6 side of the piston 19. The oil chamber plate 21 is a member for defining a first oil chamber C1 together with the piston 19 therebetween. The oil chamber plate 21 has a disc shape and includes a tubular portion 21a on the outer peripheral part thereof. The oil chamber plate 21 is fixed at the inner peripheral part thereof to the flange 20b of the sleeve 20 by welding. Additionally, the outer peripheral part of the piston 19 is supported by the tubular portion 21a, while being movable in the axial direction.

<Hydraulic Circuit>

As shown in FIG. 2, the sleeve 20 is provided with a seal member S1 on the outer peripheral surface thereof. Thus, the seal member S1 seals between the outer peripheral surface of the sleeve 20 and the inner peripheral surface of the piston 19. On the other hand, the piston 19 is provided with a seal member S2 on the outer peripheral surface thereof. The seal member S2 seals between the outer peripheral surface of the piston 19 and the inner peripheral surface of the tubular portion 21a of the oil chamber plate 21. With these configurations, the first oil chamber C1 is defined between the piston 19 and the oil chamber plate 21.

The sleeve 20 is provided with a hydraulic circuit. Hydraulic oil, supplied from the inner peripheral part of the turbine hub 12, is supplied to the first oil chamber C1 through the hydraulic circuit. The hydraulic circuit includes a plurality of first oil pathways P1, a plurality of second oil pathways P2 and an oil sump Ph.

The oil sump Ph is formed by an annular groove provided on the turbine 6-side lateral surface of the sleeve 20 and an annular plate 26 for closing the groove. The first oil pathways P1 are provided from the inner peripheral surface of the annular protrusion 20a of the sleeve 20 to the oil sump Ph. The second oil pathways P2 are provided such that the oil sump Ph and the first pol chamber C1 are communicated therethrough.

On the other hand, a second oil chamber C2 is defined between the inner peripheral part of the sleeve 20 and the turbine hub 12. The hydraulic oil is supplied to the second oil chamber C2 through at least one hole 12c provided in the turbine hub 12. Additionally, the sleeve 20 is provided with a plurality of third oil pathways P3. The second oil chamber C2 and a space accommodating the clutch plates 18 are communicated through the third oil pathways P3.

<Damper Part 16>

Figure 3:
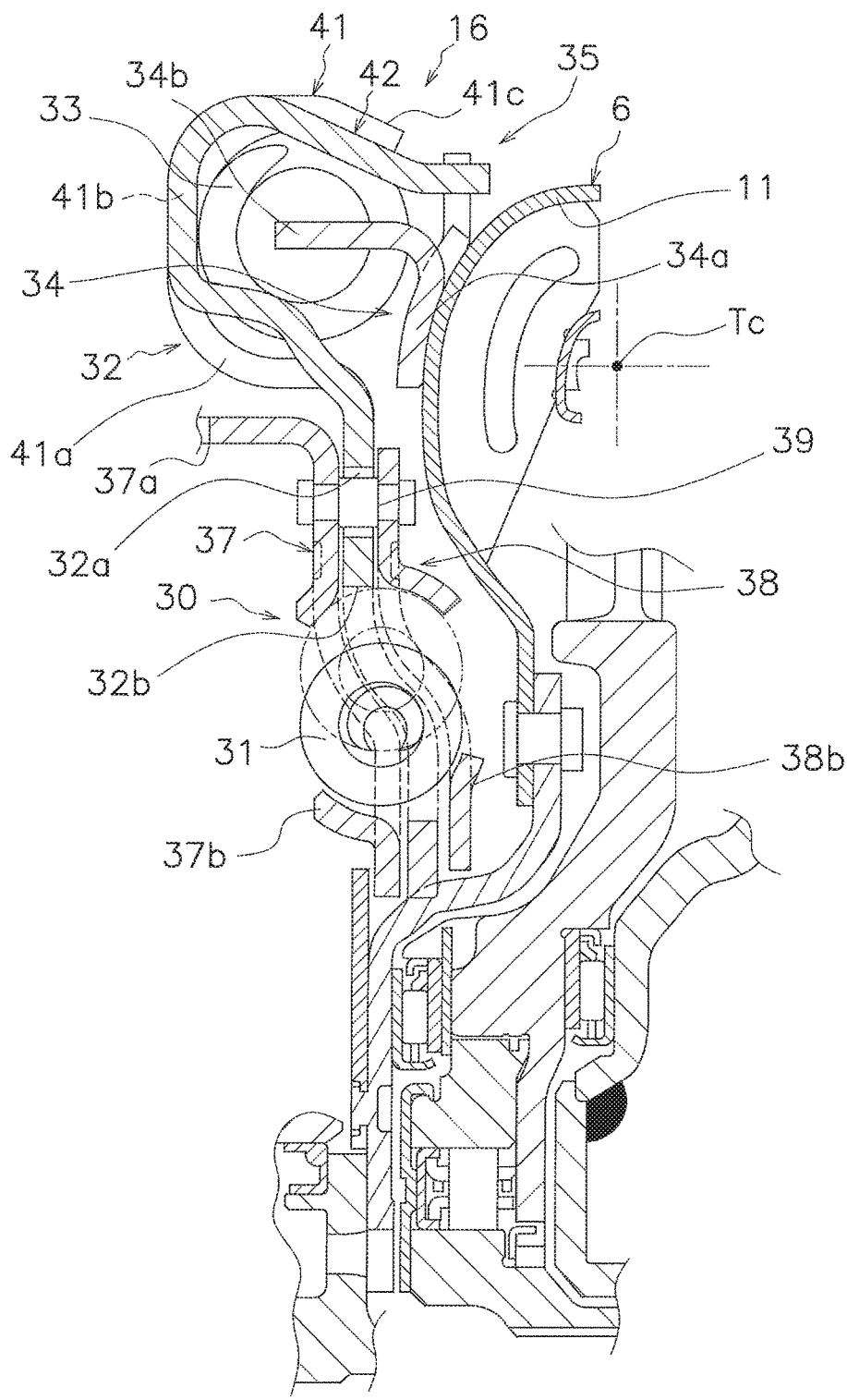
FIG. 3 is a diagram showing a damper part extracted from the device in FIG. 1.

The damper part 16 attenuates vibration to be inputted thereto through the front cover 2. As shown in FIG. 3, the damper part 16 includes an input-side plate 30 (exemplary third rotary member), a plurality of inner peripheral side springs 31 (exemplary inner peripheral side elastic members), an intermediate plate 32 (exemplary first rotary member), a plurality of outer peripheral side springs 33 (exemplary elastic members), a driven plate 34 (exemplary second rotary member) and a stopper mechanism 35.

The input-side plate 30 is provided on the output side of the clutch part 15. Specifically, the input-side plate 30 includes a first side plate 37 and a second side plate 38.

The first side plate 37 is disposed on the engine side. The first side plate 37 includes a clutch engaging portion 37a extending toward the front cover 2 and a plurality of first holding portions 37b.

The clutch engaging portion 37a has a substantially tubular shape and is provided with a plurality of grooves extending in the axial direction. The teeth, provided on the outer peripheral part of each second clutch plate 18b, are engaged with the plural grooves, respectively. With this configuration, the second clutch plates 18b and the first and second side plates 37 and 38 are non-rotatable relative to each other but are movable relative to each other in the axial direction.

The plural first holding portions 37b are window portions each extending in the circumferential direction, and hold the inner peripheral side springs 31, respectively. Additionally, each first holding portion 37b is engaged at the circumferential end surfaces thereof with the both ends of each inner peripheral side spring 31.

The second side plate 38 is disposed in opposition to the first side plate 37 at a predetermined interval in the axial direction. The second side plate 38 is fixed to the first side plate 37 by a plurality of stud pins 39 so as to be unitarily rotatable therewith.

The second side plate 38 includes a plurality of second holding portions 38b. The second holding portions 38b are window portions each extending in the circumferential direction, and are disposed in opposition to the first holding portions 37b, respectively. The second holding portions 38b hold the inner peripheral side springs 31, respectively. Additionally, each second holding portion 38b is engaged at the circumferential end surfaces thereof with the both ends of each inner peripheral side spring 31.

The intermediate plate 32 is disposed axially between the first side plate 37 and the second side plate 38. The intermediate plate 32 is rotatable relative to the respective side plates 37 and 38 and the driven plate 34. The intermediate plate 32 is a member for causing the inner peripheral side springs 31 and the outer peripheral side springs 33 to act in series.

Figure 4:
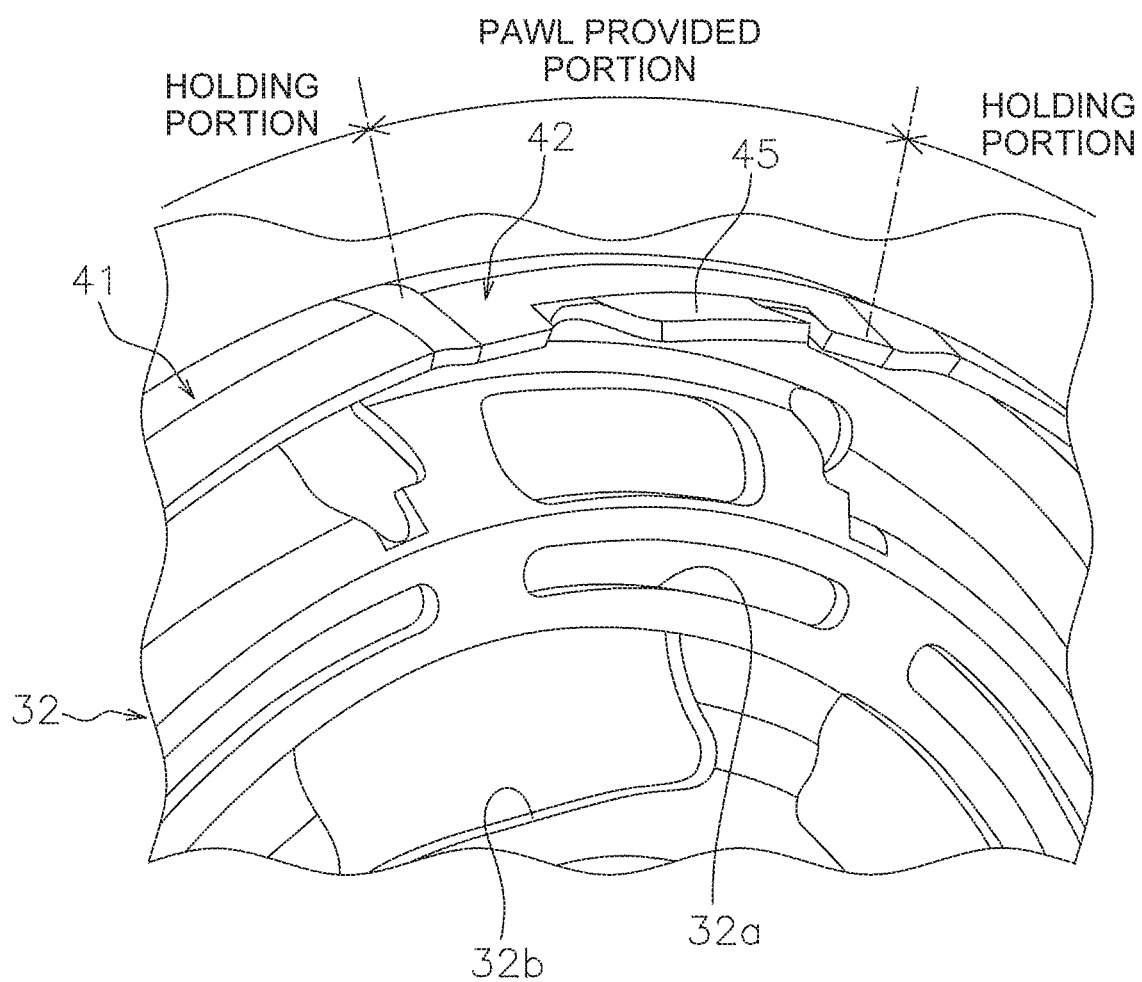
FIG. 4 is a partial external perspective view of an intermediate plate.

The intermediate plate 32 includes a cross-sectionally C-shaped part in the outer peripheral part thereof. The cross-sectionally C-shaped part has a circumferentially continuous shape, and as shown in FIGS. 3 and 4, includes a plurality of holding portions 41 and a plurality of pawl-provided portions 42. It should be noted that FIG. 4 is an external perspective view of the intermediate plate 32 as seen from the transmission side.

The holding portions 41 accommodate and hold the outer peripheral side springs 33, respectively. Each holding portion 41 includes an inner peripheral support portion 41a, an axial support portion 41b and an outer peripheral support portion 41c. The inner peripheral support portion 41a supports each outer peripheral side spring 33 from the inner peripheral side, whereas the outer peripheral support portion 41c supports each outer peripheral side spring 33 from the outer peripheral side. On the other hand, the axial support portion 41b restricts each outer peripheral side spring 33 from moving toward the front cover 2. Moreover, the distal end of the outer peripheral support portion 41c is bent radially inward, and accordingly, restricts each outer peripheral side spring 33 from moving toward the torque converter body 3.

The plural pawl-provided portions 42 are provided circumferentially continuous to the plural holding portions 41. Each pawl provided portion 42 is disposed between circumferentially adjacent two of the plural holding portions 41. Each pawl provided portion 42 is formed by pressing radially inward the outer peripheral support portion 41c of a predetermined holding portion 41 and by pressing radially outward the inner peripheral support portion 41a of the predetermined holding portion 41. Additionally, the pawl-provided portions 42 are capable of being engaged at the circumferential ends thereof with the both ends of the outer peripheral side springs 33. Therefore, torque transmission is enabled between the pawl-provided portions 42 and the outer peripheral side springs 33.

The intermediate plate 32 includes a plurality of elongated holes 32a and a plurality of third holding portions 32b.

Each elongated hole 32a has a circumferentially elongated shape. Each stud pin 39 is inserted through each elongated hole 32a. The both ends of each stud pin 39 are fixed to the first side plate 37 and the second side plate 38. Accordingly, the intermediate plate 32 is rotatable relative to the first and second side plates 37 and 38 within a predetermined angular range.

The plural third holding portions 32b are provided in the inner peripheral part of the intermediate plate 32 as window portions each extending in the circumferential direction. The third holding portions 32b are provided radially and circumferentially in the same positions as the pairs of first and second holding portions 37b and 38b, respectively. In other words, each third holding portion 32b is disposed in axial opposition to each pair of first and second holding portions 37b and 38b, while being disposed axially therebetween. Each third holding portion 32b accommodates each inner peripheral side spring 31, while being engaged at the circumferential ends thereof with the both ends of each inner peripheral side spring 31.

As shown in FIGS. 1 and 3, the plural outer peripheral side springs 33 are accommodated and held in the holding portions 41 of the intermediate plate 32, respectively. Additionally, the outer peripheral side springs 33 are disposed radially outside a torus center Tc of the torque converter body 3. Moreover, the outer peripheral side springs 33 act in series with the inner peripheral side springs 31 through the intermediate plate 32.

The driven plate 34 is an annular disc member and is fixed to the turbine shell 11.

Additionally, the driven plate 34 is rotatable relative to the intermediate plate 32.

The driven plate 34 includes a body 34a and a plurality of engaging portions 34b. The body 34a has a substantially annular shape and is fixed to the turbine shell 11. The engaging portions 34b are integrated with the outer peripheral part of the body 34a, while extending axially toward the engine. The engaging portions 34b are capable of being engaged with the both end surfaces of the outer peripheral side springs 33.

<Stopper Mechanism 35>

Figure 5:
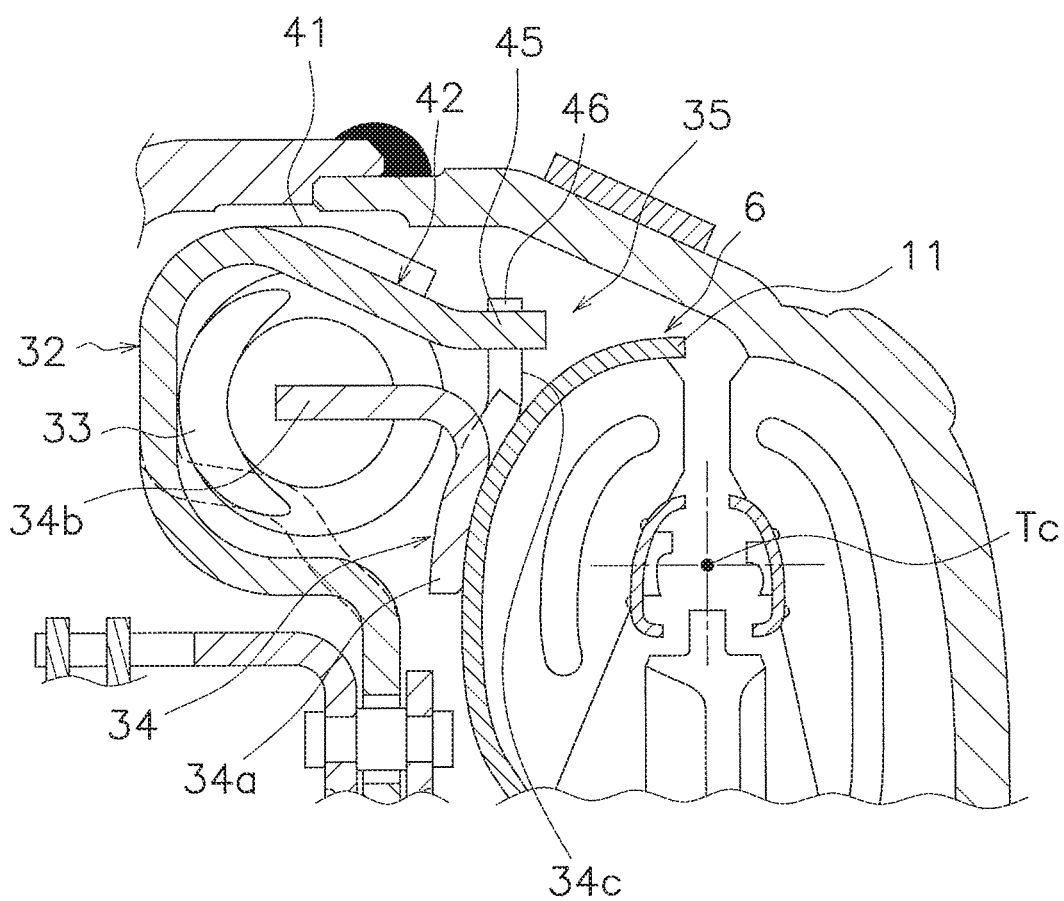
FIG. 5 is an enlarged view of a stopper mechanism.

The stopper mechanism 35 restricts the angle of relative rotation (torsion angle) between the intermediate plate 32 and the driven plate 34 to a predetermined angular range. As shown in FIGS. 1, 3 and 5, the stopper mechanism 35 is disposed axially between the outer peripheral side springs 33 and the outer peripheral part of the turbine shell 11. In more detail, although the centers of the outer peripheral side springs 33 are disposed radially outside the torus center Tc, the stopper mechanism 35 is disposed further radially outside the centers of the outer peripheral side springs 33.

Figure 6:
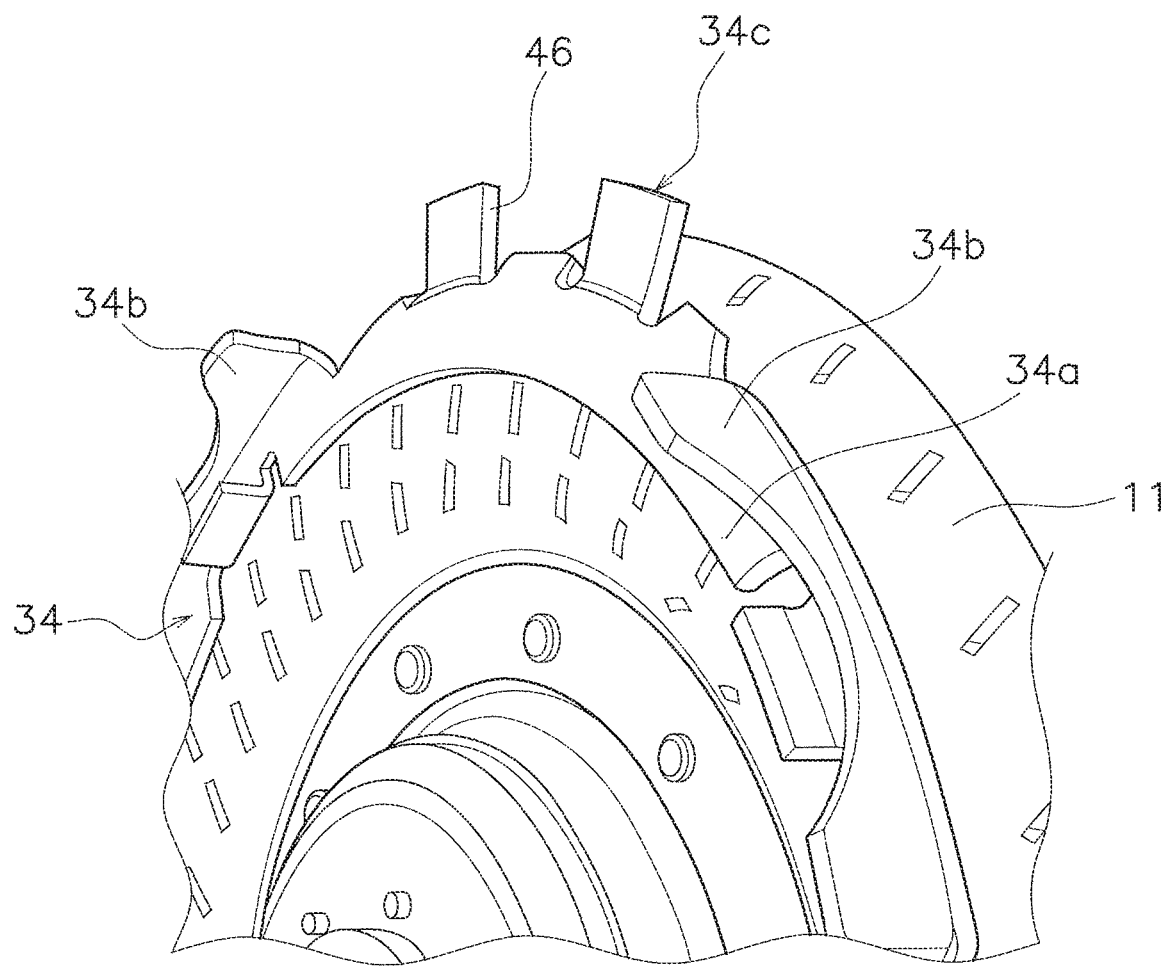
FIG. 6 is a partial external perspective view of a driven plate.

As shown in FIGS. 4 to 6, the stopper mechanism 35 includes a plurality of stopper pawls 45 and a plurality of cutouts 46. The stopper pawls 45 are provided in the intermediate plate 32, whereas the cutouts 46 are provided in the driven plate 34. It should be noted that FIG. 6 is an external perspective view of the turbine shell 11 and the driven plate 34 as seen from the engine side.

Each stopper pawl 45 is provided in each pawl provided portion 42 of the intermediate plate 32. In more detail, as shown in FIG. 4, each stopper pawl 45 is provided in a circumferentially middle part of each pawl provided portion 42, and has a predetermined width. Moreover, each stopper pawl 45 is formed by extending the outer peripheral part of each pawl provided portion 42 toward the torque converter body 3 and then bending the distal end of the extended part substantially in parallel to the rotational axis.

As shown in FIG. 6, each cutout 46 is provided in each of cutout-provided portions 34c formed by extending in part the outer peripheral part of the body 34a of the driven plate 34 radially outward. The cutout-provided portions 34c are disposed in axial opposition to the pawl-provided portions 42 of the intermediate plate 32, respectively. Each stopper pawl 45 is inserted into each cutout 46 provided in each cutout-provided portion 34c. Therefore, one circumferential end surface of each stopper pawl 45 is capable of being engaged with that of each cutout 46. In other words, one circumferential end surface of each stopper pawl 45 and that of each cutout 46 compose an engaging portion.

A predetermined gap is reliably produced between one circumferential end surface of each stopper pawl 45 and that of each cutout 46. Therefore, when the intermediate plate 32 and the driven plate 34 are rotated relative to each other by an angle θ corresponding to the gap, one circumferential end surface of each stopper pawl 45 is engaged with that of each cutout 46. In other words, the angle of relative rotation between the intermediate plate 32 and the driven plate 34 is restricted to a range of the angle θ. It should be noted that in the present preferred embodiment, each stopper pawl 45 and each cutout-provided portion 34c are orthogonal to each other.

[Action]

When the lock-up device 4 is set in a clutch-off state, a torque is transmitted from the impeller 5 to the turbine 6 through a hydraulic oil. The torque transmitted to the turbine 6 is transmitted to the input shaft of the transmission through the turbine hub 12.

It should be noted that during running of the engine, the hydraulic oil constantly flows into the second oil chamber C2 through the at least one hole 12c of the turbine hub 12, and is further supplied to the clutch plates 18 through the third oil pathways P3.

When the speed ratio of the torque converter 1 increases, the hydraulic oil is supplied to the first oil chamber C1 through the first oil pathways P1, the oil sump Ph and the second oil pathways P2. Accordingly, the piston 19 is moved toward the front cover 2. As a result, the piston 19 presses the clutch plates 18 toward the front cover 2, whereby the lock-up device 4 is turned to a clutch-on state (i.e., a lock-up state).

In the aforementioned clutch-on state, a torque is transmitted from the front cover 2 to the torque converter body 3 through the lock-up device 4. Specifically, the torque inputted to the front cover 2 is sequentially transmitted through a path of "the clutch plates 18→the first and second side plates 37 and 38→the inner peripheral side springs 31→the intermediate plate 32→the outer peripheral side springs 33→the driven plate 34" in the lock-up device 4, and is then outputted to the turbine hub 12.

In the aforementioned lock-up state, the inner peripheral side springs 31 and the outer peripheral side springs 33 are compressed in series between the first and second side plates 37 and 38 and the driven plate 34. Fluctuation in torque, occurring with torsional vibration, is thus attenuated by the actuation of the inner peripheral side springs 31 and the outer peripheral side springs 33.

When an excessive torque is inputted to the lock-up device 4 in the aforementioned lock-up state, the compression amount of each outer peripheral side spring 33 increases. In other words, when an excessive torque is inputted to the lock-up device 4, the relative rotational angle (torsion angle) between the intermediate plate 32 and the driven plate 34 increases. When the relative rotational angle reaches the angle θ corresponding to the gap between each stopper pawl 45 and each cutout 46, each stopper pawl 45 collides with one end surface of each cutout 46. Accordingly, the intermediate plate 32 and the driven plate 34 are prevented from rotating relative to each other. In other words, the stopper mechanism 35 is actuated.

The stopper mechanism 35 is herein disposed in a relatively wide space between the outer peripheral side springs 33 and the outer peripheral part of the turbine shell 11. Hence, it is possible to reliably produce a large margin of overlap between each stopper pawl 45 and one end surface of each cutout 46, i.e., a large area of each engaging portion. Additionally, the stopper mechanism 35 can be disposed on the outer peripheral side. Hence, it is possible to reduce a load borne by each engaging portion at which each stopper pawl 45 and one end surface of each cutout 46 are engaged. Therefore, abrasion of each engaging portion can be inhibited.

Moreover, the stopper pawls 45 are provided by using in part an existing component, and this is also true of the cutouts 46. Hence, it is not required to provide any component exclusively for the stopper mechanism 35.

Furthermore, each pawl-provided portion 42, provided with each stopper pawl 45, is formed by pressing in part each holding portion 41. Hence, the outer peripheral part of the intermediate plate 32 can be enhanced in strength.

[Other Preferred Embodiments]

The present invention is not limited to the preferred embodiment described above, and a variety of changes or modifications can be made without departing from the scope of the present invention.

(a) The shape of each pawl composing part of the stopper mechanism is not limited to that in the aforementioned preferred embodiment. In the aforementioned preferred embodiment, as shown in FIG. 5 and so forth, each stopper pawl 45 is provided substantially in parallel to the rotational axis, and is orthogonal to each cutout-provided portion 34*c*.

Figure 7:
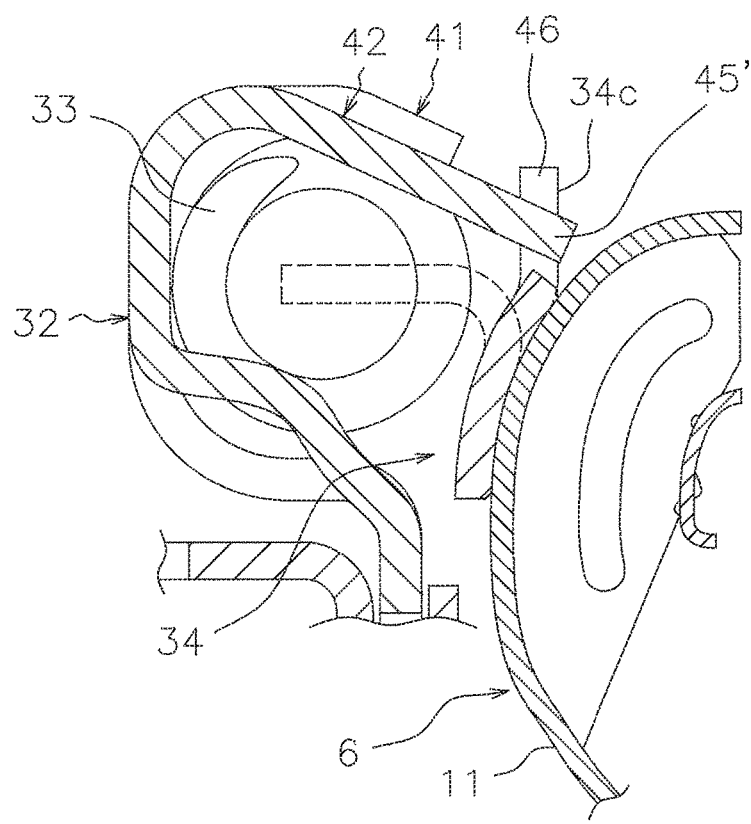
FIG. 7 is a diagram showing another example of the stopper mechanism.

By contrast, in another preferred embodiment shown in FIG. 7, each stopper pawl 45' is formed by extending in part each pawl-provided portion 42 as it is at the same tilt angle as the other part thereof, and is engaged with each cutout 46. The other configurations are completely the same as those in the aforementioned preferred embodiment.

Figure 8:
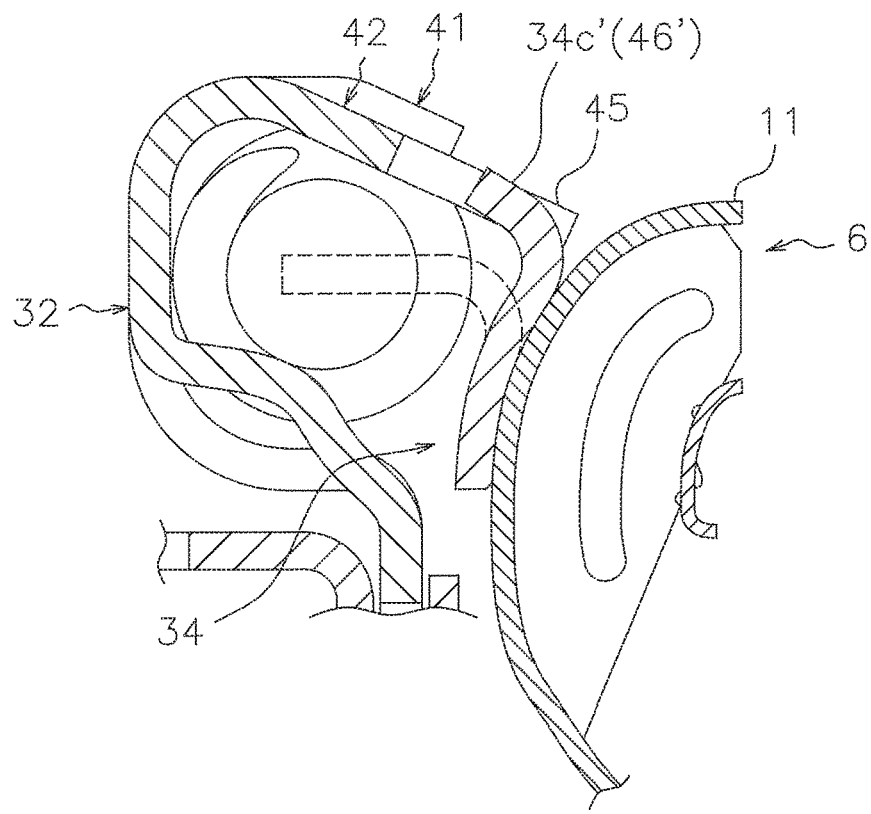
FIG. 8 is a diagram showing yet another example of the stopper mechanism.

Alternatively, in yet another preferred embodiment shown in FIG. 8, the shape of each stopper pawl 45 is the same as that shown in FIG. 5. However, the extending direction of each cutout-provided portion 34*c'* of the driven plate 34 is different from that of each cutout-provided portion 34*c* in the aforementioned preferred embodiment. In the yet another preferred embodiment, each stopper pawl 45 and each cutout-provided portion 34*c'* (i.e., each cutout 46') extend to tilt at substantially equal angles with respect to the rotational axis. In this case, it is possible to widen as much as possible a margin of overlap for an engaging portion at which each stopper pawl 45 and each cutout 46' are engaged. The other configurations are completely the same as those in the aforementioned preferred embodiment.

Figure 9:
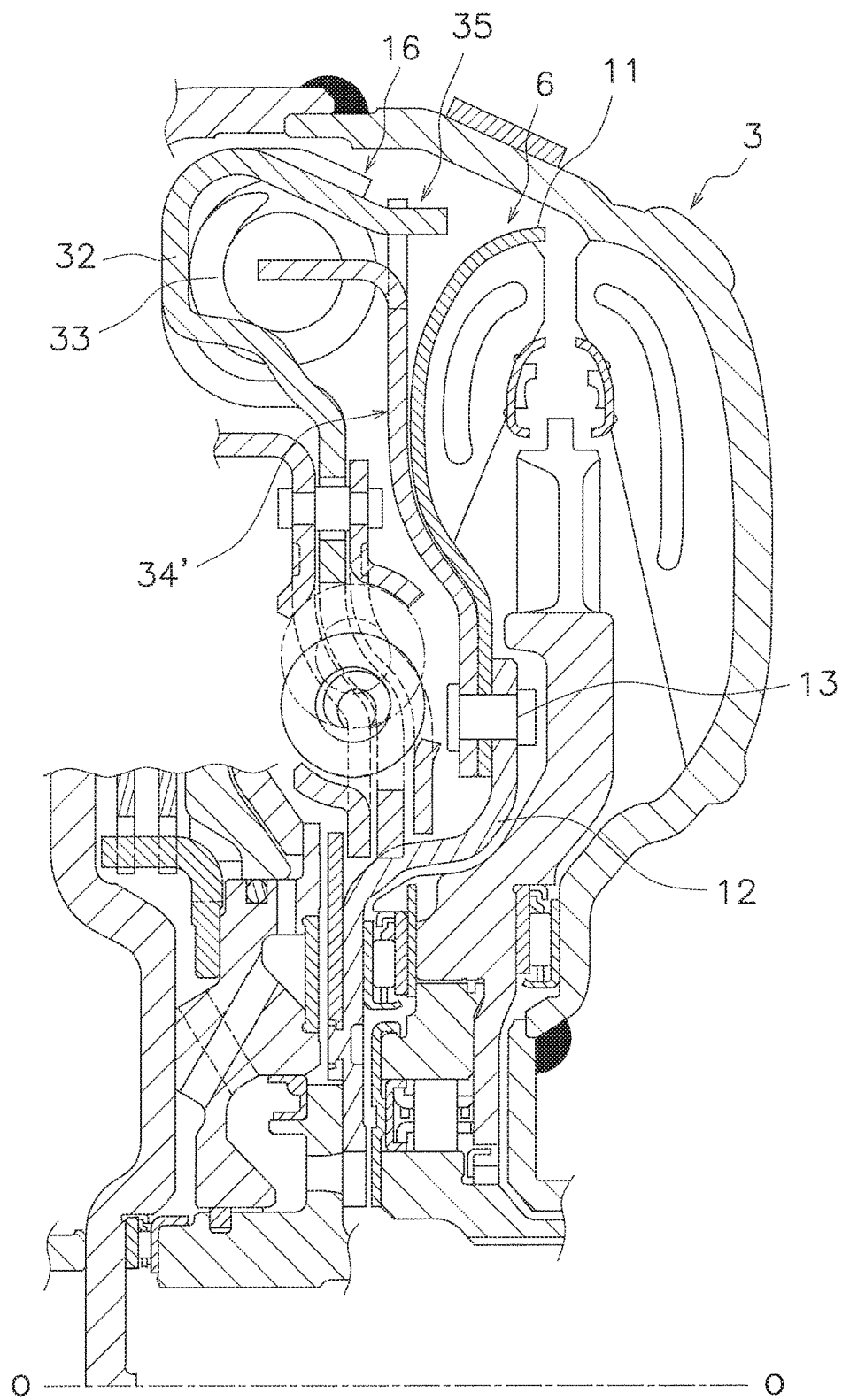
FIG. 9 is a diagram showing a driven plate according to another preferred embodiment.

(b) FIG. 9 shows another example of the driven plate. Here, a driven plate 34' has a disc shape, and the inner peripheral end thereof is fixed, together with that of the turbine shell 11, to the outer peripheral end of the turbine hub 12 by the rivets 13. The present invention is similarly applicable as well to the configuration herein described. The other configurations are completely the same as those in the aforementioned preferred embodiment.

(c) In the aforementioned preferred embodiment, the intermediate plate 32 is provided with the stopper pawls 45, whereas the driven plate 34 is provided with the cutouts 46. However, contrarily to this, the driven plate can be provided with stopper pawls, whereas the intermediate plate can be provided with cutouts.

(d) The aforementioned preferred embodiment has exemplified the clutch part of a multi plate type. However, the present invention is similarly applicable even when the clutch part is of a single plate type.

REFERENCE SIGNS LIST

1 Torque converter
2 Front cover
3 Torque converter body
4 Lock-up device
6 Turbine
11 Turbine shell
15 Clutch part
30 Input-side plate (third rotary member)
31 Inner peripheral side spring (Inner peripheral side elastic member)
32 Intermediate plate (first rotary member)
33 Outer peripheral side spring (elastic member)
34 Driven plate (second rotary member)
34*b* Engaging portion
34*c* Cutout-provided portion
35 Stopper mechanism
41 Holding portion
42 Pawl-provided portion
45 Stopper pawl
46 Cutout

What is claimed is:

1. A lock-up device for a torque converter configured to transmit a torque inputted to a front cover to a transmission-side member through a turbine including a turbine shell, the lock-up device comprising:
    a clutch part provided between the front cover and the turbine, the clutch part configured to transmit the torque inputted to the front cover to the turbine;
    a first rotary member disposed between the clutch part and the turbine;
    a second rotary member rotatable relative to the first rotary member, the second rotary member coupled to the turbine;
    a plurality of elastic members configured to elastically couple a radially outer peripheral part of the first rotary member and a radially outer peripheral part of the second rotary member in a rotational direction; and
    a stopper mechanism disposed axially between the plurality of elastic members and an outer peripheral part of the turbine shell, the stopper mechanism including an engaging portion, the engaging portion having a cutout formed between two adjacent cutout-provided portions which protrude radially outward with respect to a radially outermost edge of the second rotary member, the engaging portion configured to restrict an angular range of relative rotation between the first rotary member and the second rotary member, the engaging portion overlapping at least one of the plurality of elastic members as viewed along an axial direction.

2. The lock-up device for a torque converter according to claim 1, further comprising:
    a third rotary member coupled to an output side of the clutch part, the third rotary member rotatable relative to the first rotary member and the second rotary member; and
    a plurality of inner peripheral side elastic members disposed radially inside the plurality of elastic members, the plurality of inner peripheral side elastic members configured to elastically couple the third rotary member and the first rotary member in the rotational direction.

3. The lock-up device for a torque converter according to claim 1, wherein
    the engaging portion of the stopper mechanism further includes a stopper pawl provided on the first rotary member, and
    the cutout is configured to make the stopper pawl rotatable within a predetermined angular range in a state where the stopper pawl is inserted therein.

4. The lock-up device for a torque converter according to claim 3, wherein
    the first rotary member includes
    a plurality of holding portions provided in an outer peripheral end of the first rotary member, the plurality of holding portions configured to accommodate and hold the plurality of elastic members, and
    a plurality of pawl-provided portions, each provided between circumferentially adjacent two of the plurality of holding portions, and
    the stopper pawl is provided in each of the plurality of pawl-provided portions.

5. The lock-up device for a torque converter according to claim 4, wherein
    the plurality of holding portions and the plurality of pawl-provided portions are provided circumferentially continuous to each other, and outer peripheral parts of the plurality of pawl-provided portions are formed by pressing outer peripheral parts of the plurality of holding portions radially inward.

6. The lock-up device for a torque converter according to claim 4, wherein
the plurality of pawl-provided portions of the first rotary member are opposed at circumferential ends thereof to circumferential end surfaces of the plurality of elastic members, the plurality of pawl-provided portions configured to transmit the torque together with the plurality of elastic members therebetween, and
the second rotary member includes a plurality of axially extending portions each having an axially extending shape, the plurality of axially extending portions configured to transmit the torque together with the plurality of elastic members therebetween.

7. The lock-up device for a torque converter according to claim 3, wherein
the stopper pawl is formed by extending in part the first rotary member toward the turbine.

8. The lock-up device for a torque converter according to claim 7, wherein the stopper pawl and the cutout-provided portion intersect at a predetermined angle.

9. The lock-up device for a torque converter according to claim 7, wherein the stopper pawl and the cutout-provided portion extend to tilt at substantially equal angles with respect to a rotational axis of the first and second rotary members.

10. A lock-up device for a torque converter, the lock-up device disposed between a front cover and a torque converter body including a torus, the lock-up device configured to transmit a torque inputted to the front cover to a turbine of the torque converter body therethrough, the lock-up device comprising:
a clutch part provided between the front cover and the turbine, the clutch part configured to transmit the torque inputted to the front cover to the turbine;
a first rotary member disposed between the clutch part and the turbine;
a second rotary member rotatable relative to the first rotary member, the second rotary member coupled to the turbine;
a plurality of elastic members disposed radially outside a center of the torus, the plurality of elastic members configured to elastically couple the first rotary member and the second rotary member in a rotational direction; and
a stopper mechanism disposed on the outer peripheral side of centers of the plurality of elastic members, the stopper mechanism including an engaging portion, the engaging portion having a cutout formed between two adjacent cutout-provided portions which protrude radially outward with respect to a radially outermost edge of the second rotary member, the engaging portion configured to restrict an angular range of relative rotation between the first rotary member and the second rotary member.

* * * * *